June 3, 1941.  A. SCHÖNWALD  2,244,406
ELECTRIC MOTOR
Filed May 27, 1938
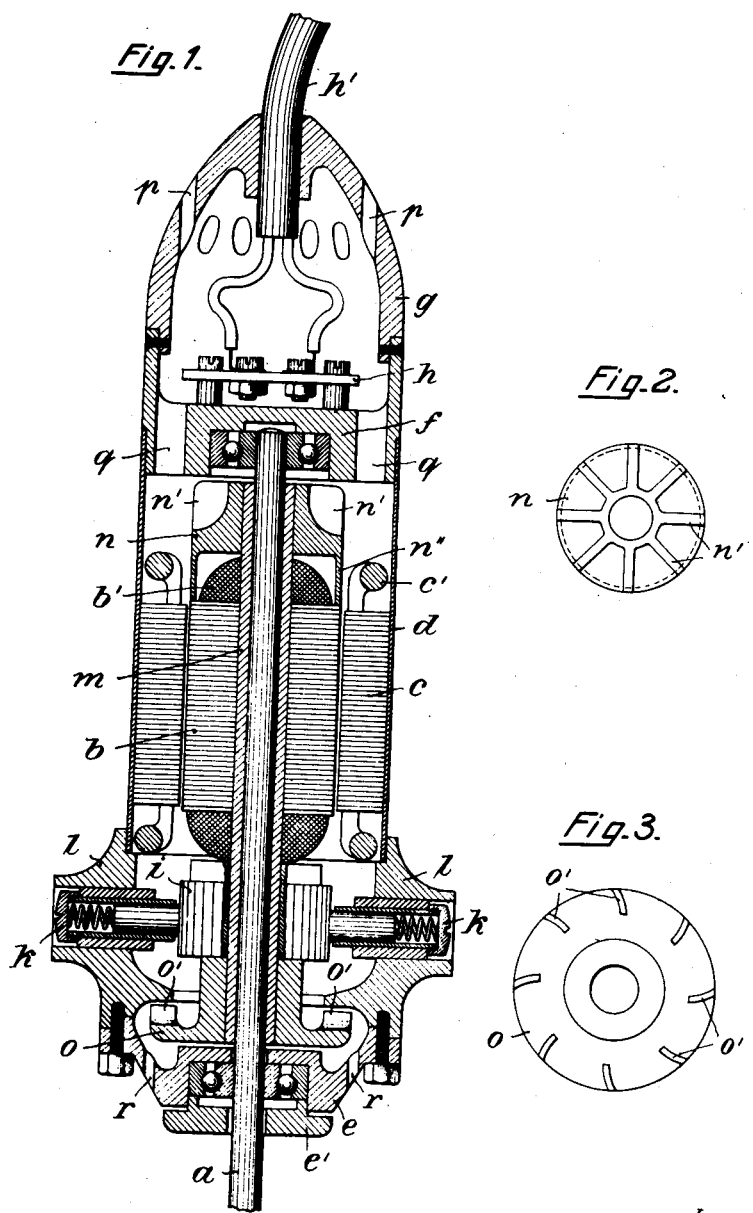

June 3, 1941.  A. SCHÖNWALD  2,244,406
ELECTRIC MOTOR
Filed May 27, 1938  2 Sheets-Sheet 2
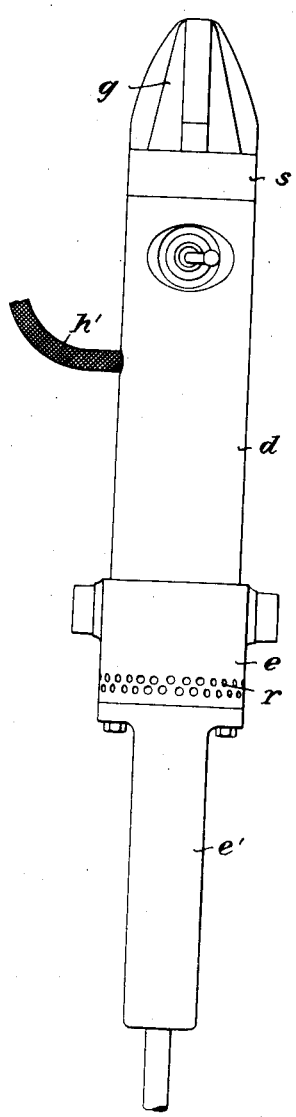
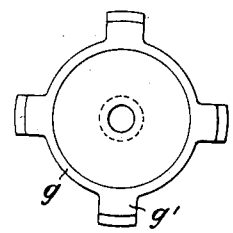
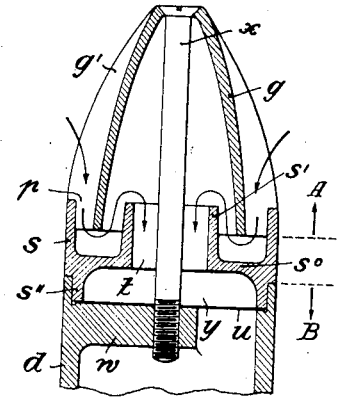
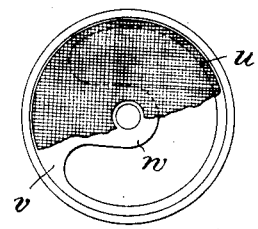
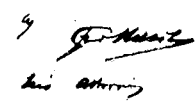

Patented June 3, 1941

2,244,406

UNITED STATES PATENT OFFICE 2,244,406

ELECTRIC MOTOR

Alexander Schönwald, Berlin, Germany

Application May 27, 1938, Serial No. 210,383
In Great Britain May 28, 1937

3 Claims. (Cl. 171—252)

The invention relates to electric motors and to means for carrying off the heat generated in electric motors for direct current or alternating current or for both kinds of current. Although the invention can be used in electric motors of different dimensions and for different purposes, it is of particular use in those electric motors that require to be light in weight and easy to handle and which must be suitable for operation with high efficiency. Demands of this kind are particularly made in motors for electrically driven hand machine tools such as hand machines for drilling, grinding and the like. The driving motors for such hand tools must be of compact construction in order that the weight and size are corresponding small; the necessary work of the motor is accomplished by the suitably high speed of the armature or rotor. The effect of reducing the dimensions for any given electrical output is that the surface of the armature or rotor that is available for radiating heat is extremely small in relation to the heat generated in the windings of the armature or rotor. It is known that in large machines it is possible to employ for cooling purposes, air passed through cavities within the armature or rotor; this is not possible however in machines of compact design because the internal space available within the laminated rotor is completely taken up by the winding. Thus in electric motors of compact design it has been necessary to take into account the fact that such motors can be operated only with considerable periodic interruptions in order to render possible the periodic cooling of the parts and dispersion of the heat.

By the present invention armatures and rotors for electric motors can be constructed which are capable of operating continuously with high efficiency and in which there is no fear of the admissible temperature being exceeded notwithstanding compact construction of the motor. To secure this result according to the invention the heat developed in the armature or rotor is drawn off directly from within the interior of the armature or rotor not only by radiation from the surface but also by the provision of a layer or sleeve of heat-conducting material and thence conducted to heat radiating bodies provided for the purpose. Thus, the invention consists in an electric motor in which between the shaft and the armature or rotor core which carries the windings a layer or sleeve of material of greater heat conductivity than that of iron or steel is provided and one or more bodies having a large radiating surface is or are carried by the said layer or sleeve at a position or positions outside and spaced from the armature core or end rings or discs. A serviceable heat-conducting layer or sleeve consists of a metal tube inserted between the shaft and the core of the armature or rotor that consists of iron laminae, the specific heat conductivity of the metal tube being greater than that of the iron; the metal tube extends at one or both ends beyond the armature or rotor and is provided at its end or ends with one or more radiating bodies which thus rotate with the motor shaft and deliver up the heat received to the circumambient air.

To improve the effect of these rotating bodies, or one of them, the rotating body may be constructed in the form of a fan wheel in order to produce a flow of air that penetrates and passes through the interior of the motor casing.

Furthermore the rotating bodies may be so constructed that they envelop the winding heads of the rotor, protect it from blows and the effects of moisture.

The accompanying drawings illustrate by way of example one construction according to the invention.

Figure 1 illustrates in longitudinal section an electric motor that can be operated by means of direct current or alternating current and is so constructed that the casing can be employed as a handle or holder for electrically driven device such as a grinding disc.

Figures 2 and 3 are views of the two radiating bodies.

Fig. 4 shows on a different scale in elevation a modified form of construction of the same machine in which a separate arrangement for the dust separation is added at the rear end.

Fig. 5 is a longitudinal section of the rear end of this machine.

Fig. 6 and 7 are plan views of the individual elements of this arrangement viewed in the direction of the arrows A and B respectively.

In carrying the invention into effect as illustrated in the accompanying drawings there is mounted on the motor shaft $a$ the rotor core $b$, which is in known manner built up of iron laminae, the winding being disposed in the recesses of the core; the winding heads of the rotor are indicated at $b'$. The stator $c$ is likewise formed of laminated iron, it contains the exciting coils $c'$ and it is secured within the metal casing $d$. The rotor shaft is carried in the ball bearings which are provided in the front and rear bearing members $e$ and $f$; the member $f$ is connected to the metal casing $d$ and to the protecting cover g, which latter encloses the terminal place h and also the ends of the leads h'. Disposed between the rotor and the forward shaft bearing is the collector or commutator i, over which slide the carbon brushes located in the holders k. The brushes are carried by the cover l, which is inserted between the casing d, and the forward bearing member e. All these parts may be of any other suitable form and construction.

Between the shaft a and the bore b of the rotor, there is located according to the invention a sleeve or layer advantageously in the form of a tube m, which is made of a good heat conducting material such as copper, silver, aluminium or their alloys or from a combination of substances whose heat conductivity exceeds that of iron. The tube m is longer than the rotor b and it is provided at its ends with radiating bodies n and o, which in Figures 2 and 3 are shown in end elevations. The radiating bodies are provided advantageously with ribs for increasing the radiating surface. The body n is provided for the purpose with radial ribs or fins n', while in the case of the body o, the ribs or fins o' are formed at the same time as the blade surfaces so that a wheel is produced which acts as a fan or blower and which when the shaft rotates induces a stream of cooling air through the holes p in the protecting cover g and through the holes q in the bearing member f, the air returning to the atmosphere through the holes r, in the forward bearing member e. As will be seen from the drawings the radiating body n is at the same time constructed as a cap which surrounds and thus protects the adjacently disposed winding head b'; the other radiating body n may be of like construction if the motor is driven only by alternating current and accordingly need not be provided with a collector located close beside the armature, it being understood that by the term "windings" is included the conductor rods or bars of a squirrel cage or like rotor. The laminae of the rotor b are secured to the tube m to ensure good conduction; the same applies to the contact between the tube m and the radiating bodies n and o.

Experiments have shown that a motor constructed according to the invention can be driven continuously, whereas the same motor not provided with means for ventilating and cooling becomes so hot after a time that its further operation becomes impossible. However, it is of primary importance that a machine constructed according to the invention can be driven at an exceptionally high speed. For example a machine which at a given output should not perform more than 7000 revolutions per minute, because otherwise the radiating surface becomes too small, can by applying the invention be constructed for a speed of 20,000 revolutions per minute without changing the armature dimensions.

Owing to this high speed of rotation the fan o produces an exceptionally strong draught of air within the machine which is also advantageous for the cooling. This particularly strong draught, however, also has its disadvantages, especially when it is a question of a hand machine tool for grinding, milling or the like. It has been noticed that the fan o rotating at a very high speed produces such a strong suction effect at the inlet holes p of the machine that all the dust from the surroundings of the machine, and especially the fine metal dust which unavoidably collects on the workbench, is sucked into the machine. Consequently, the machine can only be used practically at the high speed indicated if a device is provided for protecting the ball bearings of the machine, the electric contacts and so forth against the dust sucked up which acts like emery on these points. An obvious course would be, to cover the inlet holes p on the outer side with filtering sieves. However, such an arrangement would not be of much use as only very fine sieves, so-called hair-sieves, come into question which are very delicate and would soon become torn during the manipulation of the hand machine tool. This objection is overcome in the machine according to the invention.

In the form of construction illustrated in Figs. 4 to 7 the machine is provided with a fine hair sieve for this purpose, which sieve is arranged in the interior of the casing so that it cannot become damaged by careless handling of the machine. The arrangement is such that the sieve can be easily removed and cleaned at any time. The suction effect being particularly strong, as stated above, the fine sieve would very quickly become clogged in service and have to be cleaned at short intervals, this being very inconvenient. The arrangement according to the invention is therefore so constructed that the greater part of the dust and dirt particles, especially the heavy metal dust, is separated from the air current by centrifugal effect before the air current passes through the fine sieve. The centrifuged dust collects in pockets, which can also be emptied when the sieve is removed for cleaning. The dust particles finally drawn through the sieve are so fine that they can no longer settle in the ball bearings or on the contacts but are continually blown away by the strong air current.

In the form of construction illustrated in Fig. 4 the casing is again composed of the elements g, d, e and e', only the element e' being extended so as to afford a better bearing for the relatively long tool spindle. At the upper end the machine is different in that the current feed cable h' is introduced from the side, and the rear end of the machine is formed by giving the cover g a suitable shape and by interposing an extra element s as dust separating device.

This construction is illustrated in Figs. 5 to 7. The cap shaped element g is of smaller diameter than the ring-shaped element s but has several external ribs g' which are turned off at their ends so that the cap-shaped element g can be inserted centrally in the ring-shaped element s. Thus, gaps p are formed between the ribs through which gaps the cooling air can be sucked. The ring-shaped element s has a partition or baffle wall $s^0$ with an aperture t in the middle. The aperture is surrounded by a collar s' which projects into the hollow space in the cap-shaped element g; consequently the edge of the cap-shaped element also extends into the annular space formed between the outer wall of element s and the collar s'.

The ring-shaped element s has a packing and centering flange s'' engaging in the part d of the casing. The fine sieve u constructed as a disc with a central aperture is pressed on to its seat v (Fig. 7) by means of this flange. The element g is fixed by means of a central bolt x extending through the sieve and screwed into a lug w formed on the inner side of the casing part d.

If the machine is started up, air is sucked in the direction of the arrows Fig. 5. As can be seen, the air entering at the periphery is first sharply deflected in opposite directions of movement by means of baffles formed by the parts s, g, s', with the result that the greater part of the dust and dirt particles carried along by the air current is separated out. These particles collect in the removable casing parts g and s. The air thus purified is united to form a continuous current around the bolt x and passes through the aperture t into a much wider chamber y before reaching the dust filter sieve u. The sudden widening of the air current presents the advantage that the speed at this point is considerably reduced and the dust particles still to be separated are not forcibly pressed through the sieve. The air then flows through the electric elements arranged in the interior of the casing and passes out into the open through the holes r in element e.

As shown in Fig. 5 the delicate sieve is reliably protected against any impact and damage. In spite of being enclosed it can nevertheless be cleaned easily. It is only necessary to unscrew the bolt x and lift out the elements g and s, after which the sieve can be removed without difficulty. At the same time the dust and dirt which have collected in these elements g and s can be shaken out.

I claim:

1. An electrically driven hand-machine, comprising an electric motor with rotor, a shaft carried by and rotatable with said rotor, a casing accommodating said motor and said shaft, a fan on said shaft for producing a cooling air current passing from one end to the other of said casing, a removable cap on one end of said casing having air admission holes, a removable ring-shaped part fitted between the removable cap and said casing, and a fine hair sieve detachably clamped between the ring-shaped part and said casing, the cap and the ring-shaped part interengaging to form baffles to sharply deflect the air current before it passes the sieve.

2. An electrically driven hand-machine, comprising an electric motor with rotor, a shaft carried by and rotatable with said rotor, a casing accommodating said motor and said shaft, a fan on said shaft for producing a cooling air current passing from one end to the other of said casing, a removable cap on one end of said casing having air admission holes, a fine hair sieve detachably clamped between said cap and said casing, a lug projecting inwardly from the inner side of said casing and forming a support for said sieve, and a centrally arranged bolt screwed into said lug connecting said cap to said casing and extending through said sieve.

3. An electrically driven hand-machine, comprising an electric motor and rotor, a shaft carried by and rotatable with said rotor, a casing accommodating said motor and said shaft, a fan on said shaft for producing a cooling air current passing from one end to the other of said casing, a removable cap on one end of said casing having air admission holes, a removable ring-shaped part fitted between the removable cap and said casing, a fine hair sieve detachably clamped between the ring-shaped part and said casing, the cap and the ring-shaped part interengaging to form baffles to sharply deflect the air current before it passes the sieve, a lug projecting inwardly from the inner side of said casing and forming a support for said sieve, and a centrally arranged bolt screwed into said lug connecting said cap and said ring-shaped part to said casing and extending through said sieve.

ALEXANDER SCHÖNWALD.